H. F. HITNER.
ALTERNATING CURRENT MOTOR.
APPLICATION FILED DEC. 24, 1906.

1,014,001.

Patented Jan. 9, 1912.

Witnesses
Geo. A. Hoffman.
Edmund O. Dubocq.

Harry F. Hitner
Inventor

By his Attorney
C. W. Edwards

UNITED STATES PATENT OFFICE.

HARRY FORMAN HITNER, OF PITTSBURGH, PENNSYLVANIA, ASSIGNOR TO BURKE ELECTRIC COMPANY, A CORPORATION OF PENNSYLVANIA.

ALTERNATING-CURRENT MOTOR.

1,014,001.      Specification of Letters Patent.      Patented Jan. 9, 1912.

Application filed December 24, 1906. Serial No. 349,235.

*To all whom it may concern:*

Be it known that I, HARRY F. HITNER, a citizen of the United States, residing at Pittsburgh, in the county of Allegheny and State of Pennsylvania, have invented certain new and useful Improvements in Alternating-Current Motors, of which the following is a full, clear, and exact specification.

My invention relates to automatic circuit changing means and particularly to means for starting alternating current motors.

In the particular application of my invention described herein, I have shown and described the same as applied to starting a single phase motor of the induction type but it will be understood that my invention is not limited to such application as various other applications thereof may be developed. Also my invention may be developed in various forms of apparatus other than that described herein.

It is well known that single phase induction motors are started with difficulty and they are sometimes brought up to speed by extraneous means; but when once running at speed, the motor continues to run without difficulty. By my invention the motor is started and brought up to a speed as a motor of one type and then operates as an induction motor of the usual type.

My invention will be understood from the following description and accompanying drawings in which—

Figure 2:
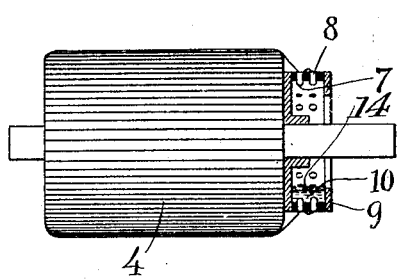
Figure 1:
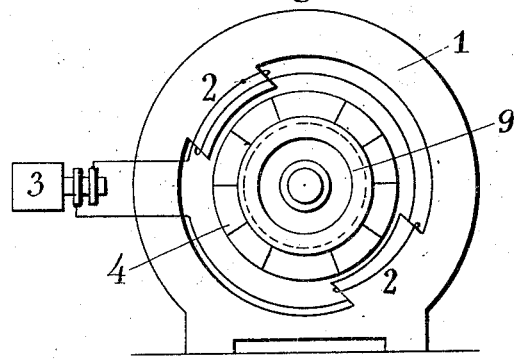

Figure 1 is a side view of a motor embodying my invention with the circuit supplied with alternating current in diagram; Fig. 2 is a side view with parts of the rotor of the motor in section; and Fig. 3 is a diagram of the windings of the rotor.

Referring to Fig. 1, the stator is represented as having the field frame 1 and two poles 2, 2, excited by alternating current from a source 3. The rotor 4 is provided with windings of any of the usual types adapted for connection to a commutator. A winding of one such form is shown in Fig. 3 and is known generally as a lap winding. In this development the two poles are indicated in dotted lines at 5, 6. The windings are connected to an inner set of insulated contacts 7 in a manner similar to the usual connection to commutator bars in a direct current machine. In addition there is a similar outer set of contacts 8, each of which is connected to one of the inner contacts located 180 degrees electrically therefrom; that is, the contacts 8 are connected successively to the contacts 7, the relative location of a connected pair of contacts being approximately 180 degrees apart electrically. The two sets of contacts 7, 8 are shown in Fig. 2 as carried by and projecting through a drum 9 which may be of insulating material or which may be metal from which the contacts are insulated as indicated in the drawing. The inside of drum 9 is formed in any suitable shape so as to retain a mobile conductive substance such as mercury 10.

In starting, the mercury 10 will of course, collect in the bottom of drum 9 and in this position will close connection between adjacent contacts of 7 and 8 covered by the mercury. As the motor gradually attains speed, the mercury will gradually distribute itself over more and more of the inner periphery of drum 9, short circuiting more and more of contacts 7, 8. At full speed all of the contacts will be short circuited giving many closed circuits of low resistance and the motor will then operate as an induction motor. While coming up to speed, the motor acts as a repulsion motor, the circuits which are closed being so related in position to the poles 2, 2 of the stator that a resultant rotary effort in one direction is produced due to the reaction upon the stator of the currents induced in said circuits.

Figure 3:
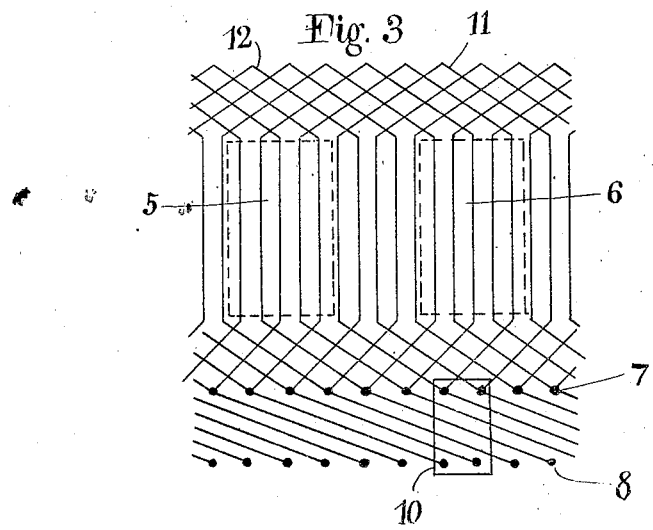

In Fig. 3 the rectangle marked 10 represents the position of the mercury when the motor is at rest. It will be seen that the circuit through all of the rotor winding is closed by the mercury joining certain contacts 7 to certain contacts 8 connected to the winding at points displaced approximately 180 degrees electrically. When the motor starts the mercury remains by action of gravity at the bottom of drum 9 and successively closes the circuit between certain of the contacts 7, 8 which maintain the rotative effort by repulsion motor action of the windings. As the speed increases, the mercury extends over more contacts, short circuiting more coils until at full speed all the contacts 7, 8 are covered by the mercury as above referred to and the motor then acts as an induction motor. Thus the motor starts as a repulsion motor and at full speed all of the winding is short circuited by the mercury extending over all the contacts and the motor then runs as an induction motor. The rapidity with which the mercury will be distributed over the whole cylindrical surface may be controlled by various factors. For example, if the cylindrical surface be made smooth and polished, a comparatively long interval will be required for the acceleration. If the surface be rough or have steps formed therein, the interval required for full distribution will be comparatively short and the acceleration more rapid. The diameter of the cylindrical member will also affect the time of distribution.

Although I have described a motor having two poles, it will be understood that any desired number of poles may be used and corresponding points in the winding may be cross connected if a multiple circuit winding be used. Also my invention may obviously be applied to other than single phase machines.

It may sometimes be desirable to use other material than mercury, such as liquids or granules of various conductive material. Also in order to reduce the sparking at contacts, it may be desirable to cover the mercury with liquid such as oil 14, or to make the cylinder a closed chamber and fill with oil.

My invention secures many advantages over prior apparatus such as in simplicity in construction, reliability in operation and requiring little or no care or attention. Moreover, the parts are easily accessible and renewable.

Although I have shown and described a form of my invention arranged to start as a repulsion motor and afterward run as an induction motor, various other modifications may be used and variations made in the form of construction without departing from the scope of my invention.

Having thus described my invention, I declare that what I claim as new and desire to secure by Letters Patent, is,—

1. In an alternating current motor, the combination of a stationary element, a rotor having a winding, and means comprising a fluent substance for connecting said winding to cause starting as a repulsion motor and for automatically changing connections upon increase in speed to cause running as an induction motor.

2. In an electric motor, the combination of a stationary element, a rotor having a winding, means comprising a fluent substance acted upon by gravity to cause connections of said winding for starting as one type of motor and for automatically changing connections upon increase in speed to cause running as a different type of motor.

3. In an electric motor, the combination of a stationary element, a rotor having a winding, connections from said winding, and a fluent substance acted upon by gravity for closing certain of said connections for causing starting as one type of motor and acted upon by movement of the rotor for closing certain of said connections for causing running as a different type of motor.

4. In an alternating current electric motor, the combination of a stationary element, a rotor having conductors, a fluent substance acted upon by gravity for connecting said conductors in one relationship with reference to each other and acted upon by a movement of the rotor for connecting said conductors in a different relationship with reference to each other.

5. In an alternating current motor, the combination of a stationary element, a rotor having conductors, a fluent substance acted upon by gravity for connecting said conductors to cause operation as a repulsion motor and acted upon by centrifugal force to cause operation as an induction motor.

In testimony whereof I affix my signature, in presence of two witnesses.

HARRY FORMAN HITNER.

Witnesses:
J. P. PROVOST,
J. L. MERRILL.